United States Patent Office 2,759,842

Patented Aug. 21, 1956

2,759,842

ASPHALT CONTAINING AN AEROGEL

Harley F. Hardman, Lyndhurst, Ohio, assignor to The Standard Oil Company, Cleveland, Ohio, a corporation of Ohio No Drawing. Application April 21, 1953, Serial No. 350,268

4 Claims. (Cl. 106—281)

The present invention relates to an asphalt composition and a method of making the same. More particularly it relates to a composition comprising petroleum asphalt, an aerogel, and a polyhydric alcohol; and to a method of making such a composition.

Asphalts are considered to be colloidal systems in which asphaltenes constitute the dispersed phase and petrolenes the dispersing phase. The term "asphaltene" as used herein refers to that portion of an asphalt which is soluble in carbon disulfide and insoluble in 50 volumes of normal pentane per volume of asphalt.

Petroleum asphalt may be defined as the residual fraction of crude oil whose lighter fractions have been removed by distillation. The asphalt possesses certain empirical characteristics, which in turn are determined by the intended use of the asphalt. The production of asphalt from crude oil is frequently controlled by allowing the distillation process to continue until the consistency of the asphalt reaches a predetermined value and then blowing air through the residue to attain the final desired consistency. This consistency is defined as the penetration of the residue.

With the development of the extensive use of asphalt cements in bituminous pavements, asphalts have been extensively investigated and a number of specifications have developed over the years. As more and more information has accumulated, additional specifications have been added from time to time to the growing list. Among the most important specifications which are frequently required of asphaltic material for various purposes are penetration of the residuum at 77° F. and 32° F., softening point, temperature susceptibility and resistance to flow.

The softening point is a standardized test for identifying different grades of asphaltic material. It is especially useful in ascertaining the adaptability of a bituminous material for many certain definite usages, such as its resistance to the sun or artificial heat. The most usual test is the standardized ring-and-ball method defined in American Society for Testing Materials (ASTM) Standards 1942, II, 488.

Penetration is defined as the consistency of a bituminous material, that is, the resistivity to deformation, and is expressed as the distance that a standard needle vertically penetrates a sample of the material under known conditions of loading, time and temperature.

Temperature susceptibility is a comparison of a consistency or hardness of the asphalt at elevated temperatures with its consistency at lower temperatures. Numerically, it is the ratio of the penetration value of the asphalt at a higher temperature to the penetration of the asphalt at a lower temperature. Several different higher temperatures and several different lower temperatures have been proposed as the best for comparison purposes. The two values are commonly taken at 77° F. and 32° F., respectively. One definition of temperature susceptibility is the ratio of penetration at 77° F. divided by the penetration at 32° F. It is generally desirable that an asphalt possess as low a temperature susceptibility value as possible because this is indicative of the fact that the asphalt is influenced but little by changes in temperature and will not become brittle at lower temperatures.

A preferred measurement of temperature susceptibility is the softening point-penetration index because this index takes into account the changes in properties over a wider temperature range. This index is equal to:

$$\frac{\log 800-\log 32°\text{ Pen.}}{\text{R and B Soft. pt.}-32}$$

and the lower the value of this index, the lower the temperature susceptibility of the asphalt.

Resistance to flow is another property of asphalt which is very desirable in many cases. At the present time there is no standardized procedure for measuring this property but it can be observed conveniently by noting that amount of deformation that occurs in a ball of asphalt that has been placed upon a flat surface. Asphalts having a high resistance to flow are especially adaptable for such uses as joint fillers and undercoatings where it is required that the asphalt remain in place after application.

The desired penetration value for the final product may be obtained by either a straight distillation to the desired consistency, or by the combination of distillation to a certain consistency followed by oxidation of the product to the finely desired consistency or penetration. Thus a penetration value of 70–80, for example, may be obtained either by distilling a crude oil completely to a penetration of 70–80 or by distilling crude oil to form a residuum of some intermediate penetration, such as 200—300 and then oxidizing this residue until the penetration value is decreased to the desired 70 or 80. During the oxidation, the percentage of asphaltenes is increased.

The oxidation of the residuum which is a commonly employed mode of operation, is usually effected by blowing air through the residue at a temperature of about 400–500° F. at a rate of about 30–50 cubic feet per minute per ton of asphalt charge until the desired penetration is obtained.

In the past, many different materials have been used as fillers or thickeners for asphalt. Such materials include clays of various types, alumina, talc, powdered asbestos and the like.

In U. S. Patent No. 1,620,900 there is described a composition comprising a major proportion of asphalt and a minor proportion of an emulsifying agent such as bentonite. The specification of this patent states that "it is evident that the peculiar property developed by this composition is a result of its having undergone emulsification" and that "the same bituminous emulsion which will produce a non-fusible end product in the absence of agitation (after removal of water) will, if agitated or disturbed, produce a fusible end product, indicating the effect of agitation in breaking up the gel structure produced by the emulsifying agent." It is evident from this disclosure that the desirable properties of the product are achieved by the emulsification of the asphalt with an aqueous mixture of the bentonite or other substances with subsequent removal of the water. The composition of this invention has several advantages over the composition of Patent No. 1,620,900, a primary advantage being that the composition of this invention does not permanently lose its desirable properties upon agitation.

In copending application Serial No. 333,002, filed January 23, 1953, by the present applicant and others, there is disclosed and claimed an asphalt composition containing a major proportion of an asphalt and a minor proportion of an aerogel. According to the teachings of the copending application, the addition of a minor amount of aerogel is productive of certain advantages which are therein described.

In accordance with this invention, it has been discovered that the addition of a small amount of a polyhydric alcohol to compositions of the type described in the aforementioned copending application is productive of even greater advantages. The compositions of this invention accordingly comprise a major proportion of asphalt, a minor proportion of an aerogel and a small amount, preferably from 1 to 25% based on the weight of aerogel, of a polyhydric alcohol. The novel characteristics of such a composition are a greatly improved resistance to flow under static conditions coupled with a low temperature susceptibility.

In a particular embodiment of this invention, the addition of the aerogel and polyhydric alcohol is employed as a substitute for at least a part of the oxidation of the pipe still bottoms from which asphalt is commonly made. Thus the addition of an aerogel and a polyhydric alcohol compensates for the increased amount of asphaltenes that it would have been necessary to produce by oxidation to obtain an asphalt of the same final penetration value. For example, in the manufacture of petroleum asphalt, pipe still bottoms are commonly oxidized to a penetration in the range of 70 to 100 at 77° F., but when an aerogel and a polyhydric alcohol are to be added, the pipe still bottoms may be oxidized to a penetration in excess of 100 at 77° F. and further decrease in penetration can be effected by addition of the additives. The asphalt compositions produced by the addition of these additives have good temperature suspectibility characteristics similar to an asphalt produced by oxidizing to the same penetration value, but the compositions possess a higher softening point and greater resistance to flow. These properties are of special importance in many applications of asphalt.

The invention is not, however, limited to the embodiment described hereinabove. The additives may be blended with petroleum asphalt of any characteristics, however produced, to impart the improved properties described herein. Thus, instead of substituting for the final stages of oxidation in producing blown asphalt, the addition of aerogel and polyhydric alcohol may also be substituted for the final stages of distillation in producing distilled asphalt without oxidation.

Among the aerogels which may be employed are those of silica, alumina, and other gel-forming metal oxides.

A series of silica aerogels which can be used in the composition of the invention are manufactured by The Monsanto Chemical Company and marketed under the trade name "Santocel."

Santocel C is prepared from a sodium silicate solution in the following manner:

The solution is neutralized with sulfuric acid and allowed to stand until the mixture sets to form a hydrogel. The by-product sodium sulfate is washed out by repeated washings with water. The continuous water phase in this hydrogel is then replaced by continued washing with alcohol until an alcogel is formed. In order to remove the liquid phase without collapse of the gel structure, the alcogel is placed in an autoclave. It is then heated above the critical temperature of the alcohol and the pressure is increased until it exceeds the critical pressure of the alcohol. The vent valve is then opened and the alcohol is permitted to escape. Under these conditions the silica gel structure remains practically undisturbed and the liquid phase of the gel is replaced with air. The material is then reduced in particle size by blowing it through a series of pipes, containing sharp bends, with jets of compressed air. Santocel C has a secondary particle size of about 3–5 microns.

Santocel A is prepared similarly to Santocel C up to the point of removal of the product from the autoclave. This material is run through a continuous heating chamber where it is heated for ½ hour to a temperature of about 1500° F. to eliminate the last traces of volatile material. It is then broken down in a reductionizer or micronized to a particle size of about 1/16 inch in diameter. The solids content of the original hydrogel used in preparing Santocel C is approximately 25% higher than that of Santocel A.

Santocel AR is a modification of A, differing in that the material is reductionized to about the same particle size as Santocel C, approximately 3 to 5 microns in diameter.

Santocel ARD is a modification of AR, differing in that ARD is densified by extracting air under vacuum and therefore has a smaller volume than AR.

Santocel AX is an A, which has not been devolatilized.

Santocel $CD_v$ is a C which has been devolatilized in the same manner as Santocel A. The Santocel is reductionized before being devolatilized.

Santocel $CD_vR$ differs slightly from $CD_v$ in that the $CD_vR$ has been devolatilized just after heating in the autoclave and then reductionized. It differs from $CD_v$ in that the latter is reductionized before being devolatilized.

The primary differences between the A and C are as follows:

1. The C's are prepared from a sodium silicate solution containing 25% more silica than the A's. Therefore, in general, the A's are lighter and composed of smaller particles than the C's.

2. The A's have undergone a devolatilization step in their preparation.

The following are the bulk densities of several of the preferred silica aerogels:

| | Density, grams/ml. |
|---|---|
| AR | 0.029 |
| ARD | 0.056 to 0.064 |
| C | 0.082 |

In general, AR and ARD show superior gelling ability and the A's in general are better than the C's.

Silica aerogels which have been devolatilized generally have a higher gelling efficiency than the undevolatilized aerogels.

The polyhydric alcohols which can be employed in the compositions and method of this invention are characterized by having from 2 to 6 hydroxyl groups, preferably 2 or 3 hydroxyl groups, attached to a hydrocarbon or oxy hydrocarbon nucleus. Examples of polyhydric alcohols which can be used are ethylene glycol, propylene glycol, diethylene glycol, triethylene glycol, tetra-ethylene glycol, trimethylene glycol, 2-ethyl hexanediol, glycerine, pentaerythritol, mannitol, sorbitol, and the various polyethylene glycols.

The asphaltic composition may contain from about 1 to 20% by weight of the aerogel, preferably 5 to 10% by weight, based on the weight of asphalt. Amounts greater than 20% cause the resulting composition to be too thick for ready application. The polyhydric alcohol is added in an amount preferably equal to about 1 to 25% based on the weight of aerogel. Solvents, such as lighter oils, may be used in the composition without impairing its temperature susceptibility properties. Likewise other additives such as clays, talc, alumina and the like may be present if desired.

The temperature of addition of the additives to the asphaltic composition is not critical and it is necessary only to have the asphalt heated to a temperature such that it is fluid, in order to obtain complete dispersion of the aerogel and polyhydric alcohol.

The invention will be further illustrated by reference to the following specific examples:

EXAMPLE 1

The results of a number of tests on a series of samples are summarized in Table I below. The asphalt compositions were prepared by heating pipe still bottoms, which had been oxidized to a penetration of 135 at 77° F., to about 300° F. and then blending in the stated amounts of additives in a high speed mixer until free from lumps or other indications of poor dispersion.

*Table I*

PROPERTIES OF ASPHALT COMPOSITIONS

| Sample | Composition | Penetration | | | R. and B. Soft. Pt., degrees | Soft. Pt.-Pen. Index ×10 ² |
|---|---|---|---|---|---|---|
| | | 100° | 77° | 32° | | |
| A | Blank | 400+ | 135 | 30 | 103 | 2.05 |
| B | 90% Asphalt; 10% Santocel ARD | 338 | 115 | 27 | 116 | 1.76 |
| C | 89% Asphalt; 10% Santocel ARD; 1% Triethylene Glycol | 275 | 90 | 23 | 156 | 1.10 |
| D | 89% 130 pen. asphalt; 10% Santocel ARD; 1% mannitol | 260+ | 80 | 25 | 123 | 1.65 |
| E | 89% 130 pen. asphalt; 10% Santocel ARD; 1% polyethylene glycol 400. | 262 | 85 | 30 | 180 | 0.964 |

Samples C, D and E show marked improvement over Samples A and B in temperature susceptibility. Samples C, D and E likewise each showed extremely high resistance to flow.

EXAMPLE 1A

In order to demonstrate that triethylene glycol is not by itself beneficial, a composition containing asphalt and triethylene glycol without aerogel was prepared in a manner similar to that described in Example 1. This composition is compared with the asphalt blank in the following table:

*Table II*

| Sample | Composition | Penetration | | | R. and B. Soft. Pt., degrees | Soft. Pt.-Pen. Index ×10 ² |
|---|---|---|---|---|---|---|
| | | 100° | 77° | 32° | | |
| A | Blank | 316 | 76 | 19 | 120 | 1.85 |
| B | Asphalt+1% Triethylene Glycol. | 240 | 74 | 23 | 117 | 1.81 |

It is observed that the addition of triethylene glycol alone results in a poorer temperature susceptibility.

EXAMPLE 2

Additional compositions were prepared in accordance with the procedure of Example 1 in order to show the effect of varying the concentrations of the additives. The results are shown in Table III below:

*Table III*

| Sample | Composition | Penetration | | | R. and B. Soft. Pt., degrees | Soft. Pt.-Pen. Index ×10 ² |
|---|---|---|---|---|---|---|
| | | 100° | 77° | 32° | | |
| A | Blank | 314 | 99 | 21 | 109 | 2.05 |
| B | 96.7% Asphalt; 3% Santocel ARD; 0.5% Triethylene Glycol. | 300+ | 92 | 24 | 114 | 1.86 |
| C | 94.5% Asphalt; 5% Santocel ARD; 0.5% Triethylene Glycol. | 271 | 93 | 26 | 122 | 1.86 |
| D | 92.3% Asphalt; 7% Santocel ARD; 0.7% Triethylene Glycol. | 227 | 80 | 22 | 125 | 1.68 |

Each of the compositions demonstrates improvement over the blank.

It will be obvious to those skilled in the art that many modifications may be made within the scope of the present invention without departing from the spirit thereof, and the invention is to be restricted only in accordance with the appended claims.

I claim:

1. An asphalt composition having improved temperature susceptibility and high resistance to flow consisting essentially of a mixture of a petroleum asphalt, from 1 to 20% by weight of a metal oxide aerogel and from 1 to 25%, based on the weight of aerogel, of an aliphatic polyhydric alcohol containing 2 to 6 hydroxy groups.

2. A composition according to claim 1 in which the polyhydric alcohol is triethylene glycol.

3. A composition according to claim 1 in which the polyhydric alcohol is a polyethylene glycol.

4. A composition according to claim 1 in which the aerogel is a silica aerogel.

References Cited in the file of this patent

UNITED STATES PATENTS

| | | |
|---|---|---|
| 1,429,338 | Glass | Sept. 19, 1927 |
| 1,943,532 | Howe | Jan. 16, 1934 |
| 1,966,094 | Herbst | July 10, 1934 |
| 2,065,881 | Alvarado | Dec. 29, 1936 |
| 2,180,145 | Harford | Nov. 14, 1939 |
| 2,188,007 | Kistler | Jan. 23, 1940 |
| 2,266,638 | Hauser | Dec. 16, 1941 |
| 2,302,286 | Almy | Nov. 17, 1942 |
| 2,415,827 | Lee | Feb. 18, 1947 |
| 2,428,608 | Bass | Oct. 7, 1947 |
| 2,717,214 | Malden et al. | Sept. 6, 1955 |